(12) United States Patent
Hammerschmidt (10) Patent No.: US 11,650,083 B2
(45) Date of Patent: *May 16, 2023

(54) SENSOR CONTROLLER, SENSOR SIGNAL RECEIVER AND SENSOR SYSTEM

(71) Applicant: Infineon Technologies AG, Neubiberg (DE)

(72) Inventor: Dirk Hammerschmidt, Finkenstein (AT)

(73) Assignee: Infineon Technologies AG, Neubiberg (DE)

( * ) Notice: Subject to any disclaimer, the term of this patent is extended or adjusted under 35 U.S.C. 154(b) by 99 days.

This patent is subject to a terminal disclaimer.

(21) Appl. No.: 17/230,441

(22) Filed: Apr. 14, 2021

(65) Prior Publication Data

US 2021/0239496 A1 Aug. 5, 2021

Related U.S. Application Data

(63) Continuation of application No. 15/848,590, filed on Dec. 20, 2017, now Pat. No. 10,982,982.

(30) Foreign Application Priority Data

Dec. 20, 2016 (DE) .................. 10 2016 125 044.9

(51) Int. Cl.
| | |
|---|---|
| *G01D 9/00* | (2006.01) |
| *G06F 1/12* | (2006.01) |
| *H04W 4/38* | (2018.01) |
| *H04W 4/70* | (2018.01) |
| *H04L 67/12* | (2022.01) |

(52) U.S. Cl.
CPC .............. *G01D 9/00* (2013.01); *G06F 1/12* (2013.01); *H04L 67/12* (2013.01); *H04W 4/38* (2018.02); *H04W 4/70* (2018.02)

(58) Field of Classification Search
CPC .. G01D 9/00; G06F 1/12; H04L 67/12; H04L 7/033; H04L 25/069; H04W 4/38; H04W 4/40; H03L 7/091
USPC ........ 375/233, 355; 702/104, 141, 151, 183, 702/188–189
See application file for complete search history.

(56) References Cited

U.S. PATENT DOCUMENTS

| | | | | |
|---|---|---|---|---|
| 4,607,375 A | * | 8/1986 | Lee ......................... | H04B 1/69 380/46 |
| RE32,432 E | * | 6/1987 | Tanaka ............... | G11B 20/1426 360/44 |
| 4,680,647 A | * | 7/1987 | Moriyama ........... | H04N 5/9267 386/323 |

(Continued)

*Primary Examiner* — Jeffrey P Aiello
(74) *Attorney, Agent, or Firm* — Harrity & Harrity, LLP (57) ABSTRACT

A sensor module includes at least one sensor configured to generate sensor information and processing circuitry configured to generate a sensor signal based on the sensor information. The sensor signal includes a sync frame, including two sync signal edges defining the sync frame and indicating a pre-determined synchronization time interval, and the sensor signal further includes a plurality of data signal portions, including at least one data signal portion transmitted within the sync frame. The at least one data signal portion is provided within the sync frame located between the two sync signal edges, wherein each of the at least one data signal portion is defined by at least one data signal edge interposed in the sensor signal between the two sync signal edges.

20 Claims, 8 Drawing Sheets

(56) References Cited

U.S. PATENT DOCUMENTS

| | | | | |
|---|---|---|---|---|
| 6,424,477 B1* | 7/2002 | Saito | ............... | G11B 20/1208 |
| 2010/0002821 A1* | 1/2010 | Hammerschmidt | ...... | H04L 7/10 |
| | | | | 375/360 |
| 2013/0173200 A1* | 7/2013 | Jockel | ............... | H04Q 9/04 |
| | | | | 702/98 |
| 2013/0197920 A1* | 8/2013 | Lesso | ............... | H04L 25/4902 |
| | | | | 704/500 |
| 2014/0139342 A1* | 5/2014 | Brown | ............... | F24F 7/065 |
| | | | | 340/603 |
| 2014/0313065 A1* | 10/2014 | Schafferer | ............... | G06F 1/04 |
| | | | | 341/118 |
| 2015/0065818 A1* | 3/2015 | Say | ............... | C12Q 1/54 |
| | | | | 600/301 |
| 2015/0146831 A1* | 5/2015 | Hammerschmidt | ...... | H04L 7/10 |
| | | | | 375/360 |
| 2016/0080141 A1* | 3/2016 | Theiler | ............... | H04L 5/1423 |
| | | | | 375/353 |
| 2016/0295305 A1* | 10/2016 | Kim | ............... | H04Q 9/00 |
| 2016/0371164 A1* | 12/2016 | Bos | ............... | G06F 11/263 |
| 2017/0008487 A1* | 1/2017 | Ur | ............... | B60R 25/102 |

* cited by examiner

SENSOR CONTROLLER, SENSOR SIGNAL RECEIVER AND SENSOR SYSTEM

CROSS-REFERENCE TO RELATED APPLICATIONS

This application is a continuation of U.S. patent application Ser. No. 15/848,590 filed Dec. 20, 2017, which claims the benefit of German Patent Application No. 10 2016 125 044.9 filed Dec. 20, 2016, which are incorporated by reference as if fully set forth.

FIELD

Examples relate to concepts for sensors, and in particular to a sensor controller, a sensor signal receiver and a sensor system.

BACKGROUND

In many fields of technology, data are transmitted from one entity to another entity using a digital encoding scheme. While in many applications highly sophisticated transmission schemes are employed, in some fields a tendency exists to allow less complex components of a system to transmit or even exchange data via a robust protocol allowing both a high throughput and a simple implementation or architecture. As a consequence, in many fields the challenge exists to balance these partially contradicting design goals to obtain a solution best suited for the specific application. For example, in motorized systems, a number of low- or medium-complexity sensors may use robust protocols to communicate with one or more complex computing units accumulating the sensor data transmitted by said sensors.

SUMMARY

There may be a demand for an improved concept for a data transmission protocol for transmitting a sensor signal between a sensor module and a sensor signal receiver.

Embodiments are presented below in the way of examples.

An example relates to a sensor controller for a sensor module. The sensor controller comprises at least one interface to obtain sensor information from the sensor module and to transmit a sensor signal to a sensor signal receiver. The sensor controller further comprises a control module to control the interface. The control module is further configured to obtain the sensor information from the sensor module. The control module is further configured to generate the sensor signal based on the sensor information. The control module is further configured to transmit the sensor signal to the sensor signal receiver. The sensor signal comprises two signal edges indicating a pre-determined synchronization time interval. The sensor signal further comprises at least one data signal portion located between the two signal edges.

An example relates to a sensor signal receiver. The sensor signal receiver comprises an interface to receive a sensor signal from a sensor controller. The sensor signal receiver further comprises a control module to control the interface. The sensor signal receiver is configured to decode the sensor signal based on a pre-determined synchronization time interval. The sensor signal comprises two signal edges indicating the pre-determined synchronization time interval. The sensor signal further comprises at least one data signal portion located between the two signal edges.

An example relates to a sensor system comprising a sensor controller, a sensor module and a sensor signal receiver. The sensor controller is configured to obtain sensor information from the sensor module, generate a sensor signal based on the sensor information, and to transmit the sensor signal to the sensor signal receiver. The sensor signal receiver is configured to receive the sensor signal from the sensor controller and to decode the sensor signal based on a pre-determined synchronization time interval. The sensor signal comprises two signal edges indicating the pre-determined synchronization time interval. The sensor signal further comprises at least one data signal portion located between the two signal edges.

BRIEF DESCRIPTION OF THE DRAWINGS

Some examples of apparatuses and/or methods will be described in the following by way of example only, and with reference to the accompanying figures, in which.

DETAILED DESCRIPTION

Various examples will now be described more fully with reference to the accompanying drawings in which some examples are illustrated. In the figures, the thicknesses of lines, layers and/or regions may be exaggerated for clarity.

Accordingly, while further examples are capable of various modifications and alternative forms, some particular examples thereof are shown in the figures and will subsequently be described in detail. However, this detailed description does not limit further examples to the particular forms described. Further examples may cover all modifications, equivalents, and alternatives falling within the scope of the disclosure. Like numbers refer to like or similar elements throughout the description of the figures, which may be implemented identically or in modified form when compared to one another while providing for the same or a similar functionality.

It will be understood that when an element is referred to as being "connected" or "coupled" to another element, the elements may be directly connected or coupled or via one or more intervening elements. If two elements A and B are combined using an "or", this is to be understood to disclose all possible combinations, i.e. only A, only B as well as A and B. An alternative wording for the same combinations is "at least one of A and B". The same applies for combinations of more than 2 Elements.

The terminology used herein for the purpose of describing particular examples is not intended to be limiting for further examples. Whenever a singular form such as "a," "an" and "the" is used and using only a single element is neither explicitly or implicitly defined as being mandatory, further examples may also use plural elements to implement the same functionality. Likewise, when a functionality is subsequently described as being implemented using multiple elements, further examples may implement the same functionality using a single element or processing entity. It will be further understood that the terms "comprises," "comprising," "includes" and/or "including," when used, specify the presence of the stated features, integers, steps, operations, processes, acts, elements and/or components, but do not preclude the presence or addition of one or more other features, integers, steps, operations, processes, acts, elements, components and/or any group thereof.

Unless otherwise defined, all terms (including technical and scientific terms) are used herein in their ordinary meaning of the art to which the examples belong.

Figure 1:
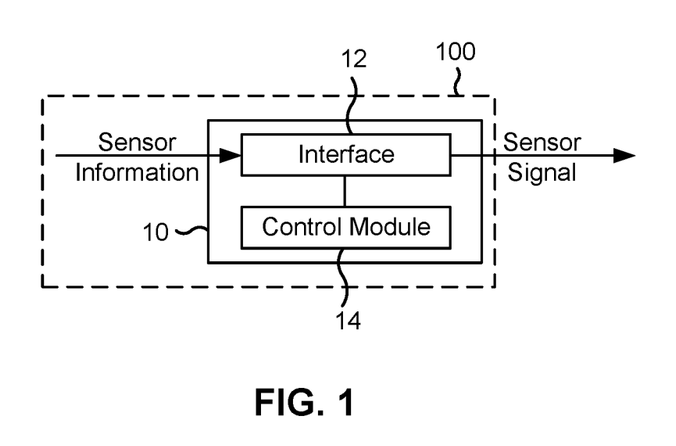
FIG. 1 shows a block diagram of a sensor controller for a sensor module.

FIG. 1 shows a block diagram of a sensor controller 10 for a sensor module 100. The sensor controller 10 comprises at least one interface 12 to obtain sensor information from the sensor module 100 and to transmit a sensor signal to a sensor signal receiver 200. The sensor controller further comprises a control module 14 to control the interface 12. The control module 14 is further configured to obtain the sensor information from the sensor module 100. The control module 14 is further configured to generate the sensor signal based on the sensor information. The control module 14 is further configured to transmit the sensor signal to the sensor signal receiver 200. The sensor signal comprises two signal edges indicating a pre-determined synchronization time interval. The sensor signal further comprises at least one data signal portion (e.g., one, two, three or more data signal portions) located between the two signal edges.

Embedding at least one data signal portion between the two signal edges indicating the synchronization time interval may decrease an overhead of the sensor signal and may increase an overall data throughput, while maintaining a reduced complexity of the transmission protocol and preserving a robustness of the protocol.

Embodiments further provide the sensor module 100 comprising the sensor controller 10. For example, the sensor module 100 may correspond to an automotive sensor module. For example, the sensor module 100 may further comprise one or more sensors to generate the sensor information. For example, the sensor module 100 may comprise at least one element of the group of an automotive sensor, a hall sensor, a temperature sensor, an angle sensor, a pressure sensor, an air flow sensor, a position sensor and a piezo sensor.

The at least one interface 12 may be configured to obtain one or more analog voltages or currents from the sensor module 100 to obtain the sensor information. Alternatively, the at least one interface may be configured to receive one or more digital values to obtain the sensor information. The sensor information may comprise one or more analog values (e.g., currents, voltages or capacitances) or digital values (e.g., as binary code, temperature code or pulse-width modulated values).

The control module 14 may be configured to measure or interpret one or more analog voltages, currents or capacitances from the sensor module 100 to obtain the sensor information. Alternatively, the control module 14 may be configured to receive, read out or interpret one or more digital values to obtain the sensor information.

The control module 14 may be configured to generate a plurality of successive signal edges to generate the sensor signal, for example. For example, a temporal distance or interval between successive signal edges may indicate an information content of the sensor signal. For example, information comprised in the sensor signal may be indicated by falling (or rising) signal edges (signal slopes). Using falling signal edges may facilitate a generation of more pronounced signal edges. For example, a distance between successive signal edges of the sensor signal may indicate (sensor) data of the sensor signal. For example, the sensor signal comprises at least the two signal edges indicating the pre-determined synchronization time interval and the at least one data signal portion. For example, the at least one data signal portion may comprise information related to the sensor information or control information. The control information may comprise at least one of a message counter, a one-bit toggle message counter, a measurement counter, a source identifier, a destination identifier, a checksum and a timestamp. The information related to the sensor information may comprise a processed (e.g., quantized or converted) version of the sensor information.

For example, the control module 14 may transmit the sensor signal via a bus system to the sensor signal receiver 200. For example, the interface 12 and the sensor signal receiver 200 may be connected to a (shared) bus. For example, further sensor controllers may be connected to the shared bus. For example, the control module 14 may be configured to transmit the sensor signal according to a transmission schedule (via the shared bus) to the sensor signal receiver 200.

For example, the control module 14 may be configured to transmit the sensor signal in response to at least one of a trigger edge, a trigger pulse or a request message initiated by the sensor receiver 200. Transmitting the sensor signal in response to a trigger may decrease an overall transmission volume and may enable the sensor signal receiver to implicitly determine a timestamp of the received sensor signal. For example, the control module 14 may be configured to receive at least one of the trigger edge, the trigger pulse or the request message via the at least one interface 12, e.g., via the shared bus.

For example, the sensor signal receiver 200 may be central computing unit or a sensor aggregation unit (e.g., of a vehicle). For example, the sensor signal receiver 200 may be configured to obtain sensor signals from a plurality of sensor controllers, e.g., via the shared bus.

For example, the two signal edges may correspond to two falling (or two rising) signal edges. Alternatively, the two signal edges may correspond to a rising and a falling signal edge. For example, the two signal edges may correspond to signal edges with a pre-defined maximal signal edge duration between a first (upper) voltage and a second (lower) voltage. For example, the two signal edges are (temporally) spaced apart by the pre-determined synchronization time interval.

For example, the pre-determined synchronization time interval may be pre-determined relative to a clock generator or relative to a unit time of the sensor controller 10. For example, the pre-determined synchronization time interval may be a pre-determined multiple of a clock or a unit time of the sensor controller 10. For example, different sensor controllers may have different pre-determined synchronization time intervals relative to their respective clock generators or unit times. The pre-determined synchronization time interval may have a deviation of less than 10% (or less than 8%, less than 5%, less than 4%, less than 3%, less than 2%, less than 1%) from a reference synchronization time interval. For example, (a fraction of) the pre-determined synchronization time interval may define a frame alignment and/or a reference pulse width of a pulse width modulation encoding. For example, the pre-determined synchronization time interval may correspond to a pre-defined synchronization time interval.

For example, the at least one data signal portion may be based on a pulse width modulation encoding. A pulsed width modulation encoding may enable a robust low-complexity transmission of sensor signals. For example, the pulse width modulation encoding may be based on at least 4 (or at least 8, at least 12, at least 16, at least 24, at least 32) different pulse widths. For example, each data signal portion of the at least one data signal portion may correspond to a nibble.

For example, the sensor signal further may further comprise a complement portion. The complement portion may be located between the at least one data signal portion and one signal edge of the two signal edges. The complement portion may fill a gap between the at least one data signal portion and one of the two signal edges indicating the pre-determined synchronization time interval. For example, the two signal edges may comprise a first earlier signal edge and second later signal edge. The complement portion may be located between the at least one data signal portion and the second later signal edge. For example, the complement portion may extend from the at least one data signal portion to the one signal edge (e.g., the second later signal edge) of the two signal edges. For example, a combined length of the at least one data signal portion and the complement portion may equal an interval between the two signal edges (e.g., the pre-determined synchronization time interval). For example, the complement portion may comprise checksum information related to the at least one data signal portion. For example, the duration of the complement portion may be used to verify a (combined) duration of the at least one data signal portion. For example, a length of the pre-determined synchronization time interval is indicated the checksum information. For example, the pre-determined synchronization time interval may be pre-determined depending on the checksum information. For example, the pre-determined synchronization time interval may be one of a plurality of pre-determined synchronization time intervals. For example, the control module 14 may be configured to generate the at least one data signal portion and the checksum information based on the pre-determined synchronization time interval of the plurality of the plurality of pre-determined synchronization time interval, e.g., based on a reference pulse width indicated by the pre-determined synchronization time interval of the plurality of the plurality of pre-determined synchronization time intervals. Depending on a chosen pre-determined synchronization time interval of the plurality of pre-determined synchronization time intervals, the sensor signal receiver 200 may be configured to estimate, which of the plurality of pre-determined synchronization time intervals was used, decode the at least one data signal portion and the checksum information based on the estimated synchronization time interval, and verify the chosen pre-determined synchronization time interval based on the decoded at least one data signal portion and the decoded checksum information, e.g., by verifying, that the decoded checksum information is valid for the decoded at least one data signal portion.

For example, the duration (length) of the complement portion and the duration of the at least one data signal portion may add up to the pre-determined synchronization time interval (e.g., reduced by a signal-slope induced delta). In at least some embodiments, the sensor signal may comprise two data signal portions located between the two signal edges. For example, the sensor signal may comprise a pre-determined number of data signal portions, e.g., exactly one data signal portion, exactly two data signal portions, exactly three data signal portions, or one or two data signal portions.

Figure 8:
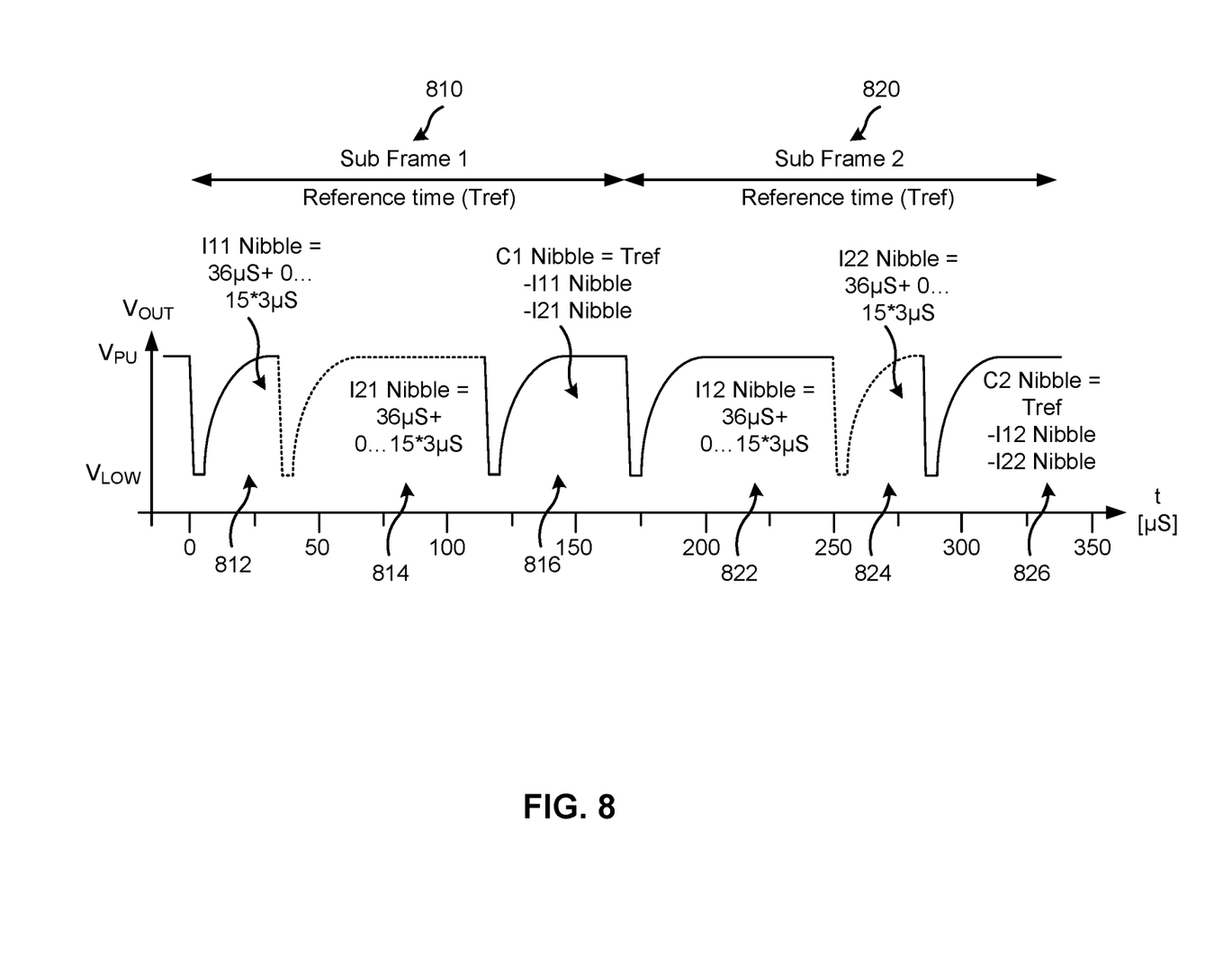

For example, in at least some embodiments, as shown in more detail in FIG. 8, the sensor signal may comprise one or more transmission messages. Each transmission message of the one or more transmission messages may comprise two signal edges indicating the pre-determined synchronization time interval and at least one data signal portion located between the two signal edges. For example, each transmission message of the one or more transmission messages may further comprise at least one data signal portion located after the second later signal edge, which may decrease an overall overhead. Alternatively, each transmission message of the one or more transmission messages may be terminated by the second later signal edge, which may facilitate a processing due to a pre-defined/pre-determined transmission message duration.

The at least one interface 12 may correspond to one or more inputs and/or outputs for receiving and/or transmitting information, which may be in digital (bit) values according to a specified code, within a module, between modules or between modules of different entities.

In embodiments the control module 14 may be implemented using one or more processing units, one or more processing devices, any means for processing, such as a processor, a computer or a programmable hardware component being operable with accordingly adapted software. In other words, the described function of the control module 14 may as well be implemented in software, which is then executed on one or more programmable hardware components. Such hardware components may comprise a general purpose processor, a Digital Signal Processor (DSP), a micro-controller, etc.

Figure 2:
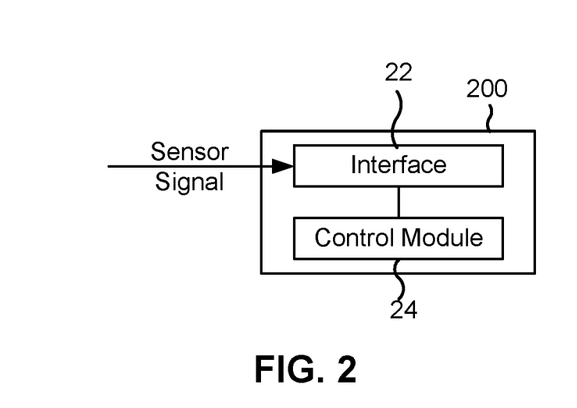
FIG. 2 illustrates a block diagram of a sensor signal receiver.

FIG. 2 illustrates a block diagram of a sensor signal receiver 200. The sensor signal receiver 200 comprises an interface 22 to receive a sensor signal from a sensor controller 10, e.g., the sensor controller 10 introduced in connection with FIG. 1. The sensor signal receiver 200 further comprises a control module 24 to control the interface 22. The control module 24 is further configured to decode the sensor signal based on a pre-determined synchronization time interval. The sensor signal comprises two signal edges indicating the pre-determined synchronization time interval. The sensor signal further comprises at least one data signal portion located between the two signal edges.

Embedding at least one data signal portion between the two signal edges indicating the synchronization time interval may decrease an overhead of the sensor signal and may increase an overall data throughput, while maintaining a reduced complexity of the transmission protocol and preserving a robustness of the protocol.

For example, the control module 24 may be configured to detect the pre-determined synchronization time interval based on a reference synchronization time interval. For example, the pre-determined synchronization time interval may be pre-determined relative to a clock generator or relative to a unit time of the sensor controller 10. For example, the two signal edges may comprise a first earlier signal edge and a second later signal edge. For example, after detecting the first earlier signal edge, the control module 24 may be configured to detect the second later signal edge based on the reference synchronization time interval. For example, the control module 24 may be configured to expect the second later signal edge at a time interval between 95% (or 98%) and 105% (or 102%) of the reference synchronization time interval after detecting the first earlier signal edge. For example, the control module 24 may be configured to determine a (relative) duration of pulse widths of a pulse width modulation encoding of the at least one data signal portion based on the received/detected pre-determined synchronization time interval.

For example, the two signal edges may comprise a first earlier signal edge and a second later signal edge. The control module 24 may be configured to decode data content encoded within the sensor signal between the first earlier signal edge and the second later signal edge based on the pre-determined time interval indicated by the two signal edges (e.g., using the measured pre-determined time interval to decode the data content encoded in the location of the edges between the two edges belonging to the pre-determined synchronization time interval). Alternatively or additionally, the control module 24 may be configured to decode data content encoded within the sensor signal following the second later signal edge based on the pre-determined time interval indicated by the two signal edges (e.g., using the measured pre-determined time interval to decode data content encoded in the location of the edges following the second edge belonging to the pre-determined synchronization time interval).

For example, the sensor signal may comprise two or more transmission messages. Each transmission message of the two or more transmission messages may comprise two signal edges indicating the pre-determined synchronization time interval and at least one data signal portion located between the two signal edges.

For example, the control module 24 may be configured to decode a current transmission message of the two or more transmission messages based on the pre-determined synchronization time interval indicated by the two signal edges of a previous transmission message of the two or more transmission messages. This may help avoid a caching of the current transmission message (timing) to first determine the pre-determined synchronization time interval before decoding the at least one data signal portion while enabling an improved timing reference compared to other systems (once per complete frame) and potentially enabling an immediate decoding of the data signal portion without buffering or latency. For example, the previous transmission message may be a directly preceding transmission message of the two or more transmission messages. For example, the control module 24 may be configured to cache the pre-determined synchronization time interval of the (directly) preceding transmission message and to adjust the cached pre-determined synchronization time interval based on the current transmission message. Alternatively, the control module 24 may be configured to decode the current transmission message of the two or more transmission messages based on the pre-determined synchronization time interval indicated by the two signal edges of every second (or every third, every fourth, every $8^{th}$) transmission message of the two or more transmission messages.

In some embodiments, the control module 24 may be configured to decode the current transmission message of the two or more transmission messages based on the pre-determined synchronization time interval indicated by the two signal edges of the current transmission message of the two or more transmission messages. The pre-determined synchronization time interval of the current transmission message may provide an improved accuracy (with respect to variations to the sensor clock) in the decoding of the current transmission message. The control module 24 may be configured to cache the (signal edges/timing of the) at least one data signal portion prior to receiving the second later signal edge of the two signal edges, and decode the at least one data signal portions of the current transmission message based on the pre-determined synchronization time interval indicated by the two signal edges of the current transmission message of the two or more transmission messages.

For example, for each transmission message of the two or more transmission messages, the two signal edges may comprise a first earlier signal edge and a second later signal edge. Each transmission message may be terminated by the respective second later signal edge. Alternatively, at least a subset of the two or more transmission messages may further comprise one or more further data signal portions located after the second later signal edge.

In some embodiments, the control module 24 may be configured to monitor an accuracy of the received pre-determined synchronization time interval and to initiate a safety measure if the accuracy violates an accuracy threshold. This may help avoid a severe deviation from the reference synchronization time interval. For example, the control module 24 may be configured to transmit a feedback message to the sensor controller 10 indicating that the accuracy threshold is violated by the sensor controller. For example, a control module 14 of the sensor controller 10 may be configured to receive the feedback message, and to adjust a generation of the sensor signal based on the received feedback message. For example, the accuracy threshold may be an absolute or relative threshold. For example, the accuracy threshold may be violated if the received pre-determined synchronization time interval is at least 10% (or at least 8%, at least 5%, at least 2%) longer (or shorter) than a reference synchronization time interval. For example, the accuracy threshold may be violated if the received pre-determined synchronization time interval is at least 20 μs (or at least 15 μs, at least 10 μs, at least 5 μs) longer (or shorter) than a reference synchronization time interval.

For example, the sensor signal may further comprise a complement portion. The complement portion may be located between the at least one data signal portion and one signal edge of the two signal edges. The complement portion may comprise checksum information related to the at least one data signal portion. The control module 24 may be configured to verify the at least one data signal portion based on the checksum information.

For example, a length of the pre-determined synchronization time interval may be indicated by the checksum information. The control module 24 may be configured to determine (e.g., monitor) the length of the pre-determined synchronization time interval based on the checksum information. For example, the control module 24 may be configured to monitor the pre-determined synchronization time interval depending on a checksum data which is part of the complement portion For example, the pre-determined synchronization time interval may be one of a plurality of pre-determined synchronization time intervals. The control module 24 may be configured to estimate, which of the plurality of pre-determined synchronization time intervals is used for the two sensor slopes. The control module 24 may be configured to decode the at least one data signal portion and the checksum information based on the estimated pre-determined synchronization time interval. The control module 24 may be configured to verify the estimated pre-determined synchronization time interval based on the decoded at least one data signal portion and the decoded checksum information, e.g., by verifying, that the decoded checksum information is valid for the decoded at least one data signal portion for the estimated pre-determined synchronization time interval.

In some embodiments, the control module 24 may be configured to transmit at least one of a trigger edge, a trigger pulse or a request message to the sensor controller 10 to initiate a transmission of the sensor signal.

The at least one interface 12 may correspond to one or more inputs and/or outputs for receiving and/or transmitting information, which may be in digital (bit) values according to a specified code, within a module, between modules or between modules of different entities.

For example, the control module 24 may be configured receive the sensor signal via a bus system and the interface 22 from the sensor controller 10. For example, the interface 22 and the sensor controller 10 may be connected to a (shared) bus. For example, further sensor controllers may be connected to the shared bus. For example, the control module 24 may be configured to receive the sensor signal via the interface 22 according to a transmission schedule (via the shared bus) from the sensor controller 10.

In embodiments the control module 24 may be implemented using one or more processing units, one or more processing devices, any means for processing, such as a processor, a computer or a programmable hardware component being operable with accordingly adapted software. In other words, the described function of the control module 24 may as well be implemented in software, which is then executed on one or more programmable hardware components. Such hardware components may comprise a general purpose processor, a Digital Signal Processor (DSP), a micro-controller, etc.

More details and aspects of the sensor signal receiver 200 are mentioned in connection with the proposed concept or one or more examples described above (e.g., FIG. 1). The sensor signal receiver 200 may comprise one or more additional optional features corresponding to one or more aspects of the proposed concept or one or more examples described above or below.

Figure 3:
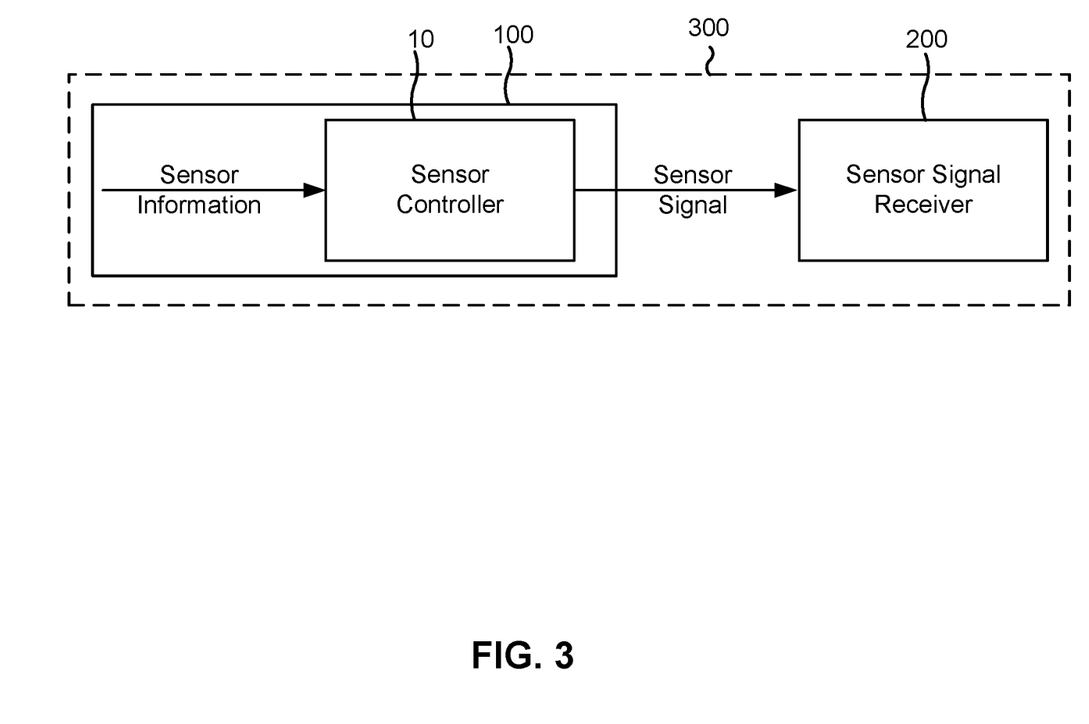
FIG. 3 illustrates a block diagram of a sensor system comprising a sensor controller, a sensor module and a sensor signal receiver.

FIG. 3 illustrates a block diagram of a sensor system 300 comprising a sensor controller 10, a sensor module 100 and a sensor signal receiver 200. The sensor controller 10, the sensor module 100 and/or the sensor signal receiver 200 may be implemented similar to one or more examples introduced in connection with FIG. 1 or 2. The sensor controller 10 is configured to obtain sensor information from the sensor module 100, generate a sensor signal based on the sensor information, and to transmit the sensor signal to the sensor signal receiver 200. The sensor signal receiver 200 is configured to receive the sensor signal from the sensor controller 10 and to decode the sensor signal based on a pre-determined synchronization time interval. The sensor signal comprises two signal edges indicating the pre-determined synchronization time interval. The sensor signal further comprises at least one data signal portion located between the two signal edges.

For example, the sensor signal receiver 200 may be configured to provide the decoded sensor signal to a vehicle. Embodiments further provide a vehicle comprising the sensor system 300. For example, the vehicle may be one of a surface vehicle, a watercraft, an aerial vehicle, a rail vehicle, a road vehicle, an automobile, an off-road vehicle, a motor vehicle or a truck.

Embedding at least one data signal portion between the two signal edges indicating the synchronization time interval may decrease an overhead of the sensor signal and may increase an overall data throughput, while maintaining a reduced complexity of the transmission protocol and preserving a robustness of the protocol.

For example, the sensor module 100 may comprise at least one element of the group of an automotive sensor, a hall sensor, a temperature sensor, an angle sensor, a pressure sensor, an air flow sensor, a position sensor and a piezo sensor.

More details and aspects of the sensor system 300 are mentioned in connection with the proposed concept or one or more examples described above (e.g., FIG. 1 or 2). The sensor system 300 may comprise one or more additional optional features corresponding to one or more aspects of the proposed concept or one or more examples described above or below.

Short Pulse Width Modulation (PWM) Code (SPC) and Single Edge Nibble Transmission (SENT) use a PWM encoding for the transmission of 4 Bit nibbles. The evaluation may be based on the falling edges. Both protocols may have a limited data rate. Conventional SENT or SPC may have an extended period in the frame header that is not used for data transmission.

Figure 4:
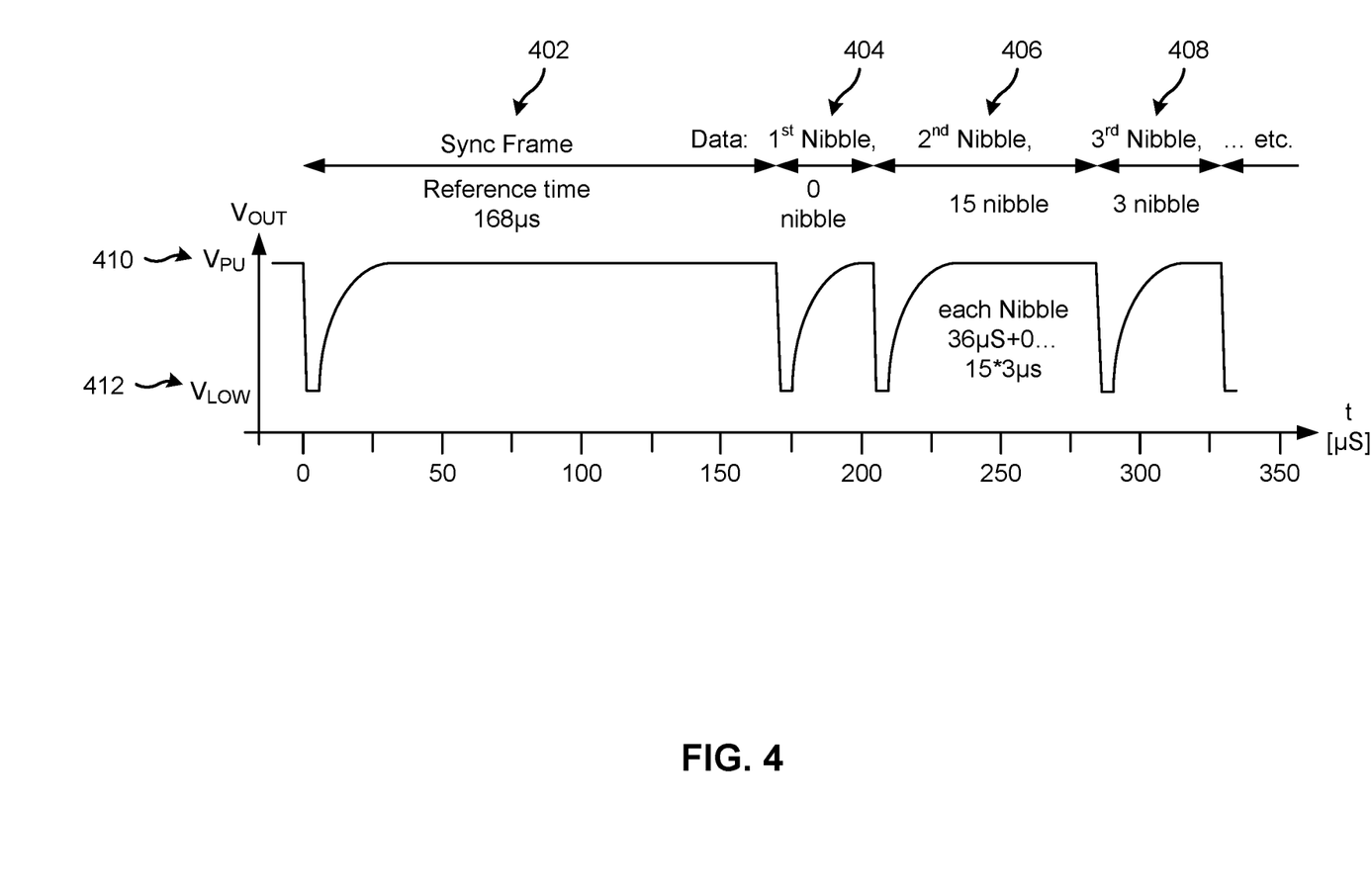
FIG. 4 shows a schematic signal diagram of a SENT transmission.

FIG. 4 shows a schematic signal diagram of a SENT transmission having a sync frame 402 defining a reference time interval of 168 μs and a data portion with a first nibble 404 (a 0 nibble (a nibble representing the value 0)), a second nibble 406 (a 15 nibble) and a third nibble 408 (a 3 nibble). Each nibble comprises a duration of 36 μs (e.g., for the rising edge)+0 . . . 15*3 μs, depending on the value represented. The reference time interval and the nibbles are denoted by a falling signal edge/edge falling from $V_{PU}$ 410 to $V_{LOW}$ 412.

Figure 5:
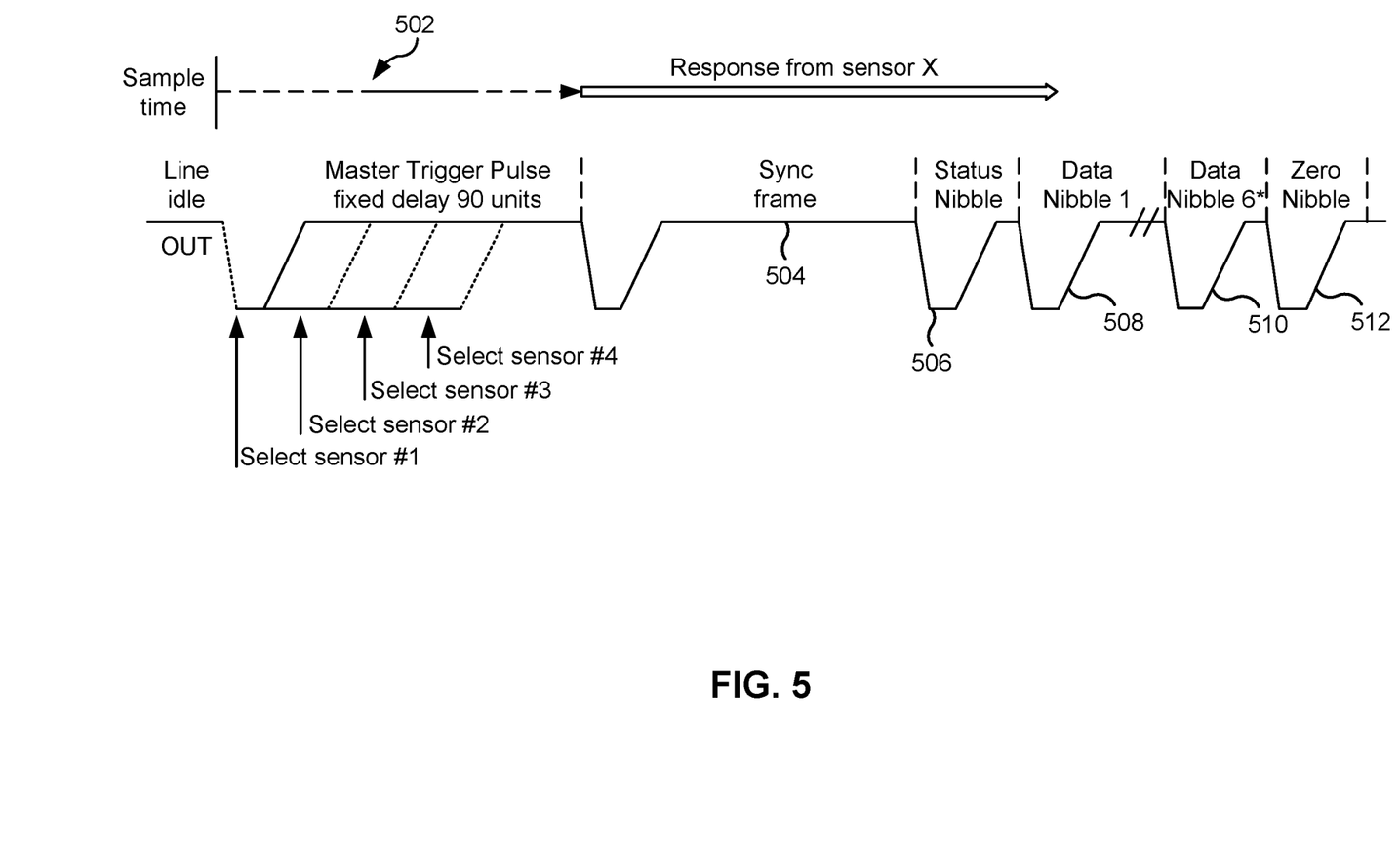
FIG. 5 shows a schematic signal diagram of a SPC transmission.

FIG. 5 shows a schematic signal diagram of a SPC transmission having a master trigger pulse 502 (e.g., of a central processing unit) with a fixed delay of 90 units and a rising-edge dependent selection of a first, second, third or fourth sensor, a sync frame 504 (as response from a sensor X), a status nibble 506a, a first data nibble 508 (and subsequent data nibbles), a sixth data nibble 510 and a zero nibble 512. Additional data nibbles (e.g., data nibbles 4-6) may be optional and programmable. The sync frame and the nibbles may be denoted by falling edges from a line idle voltage.

At least some embodiments may be based on assembling the sync frame from two data frames with complementary length. In order to stay downward compatible, the sum of both may be chosen to be 168 us, for example.

Figure 6:
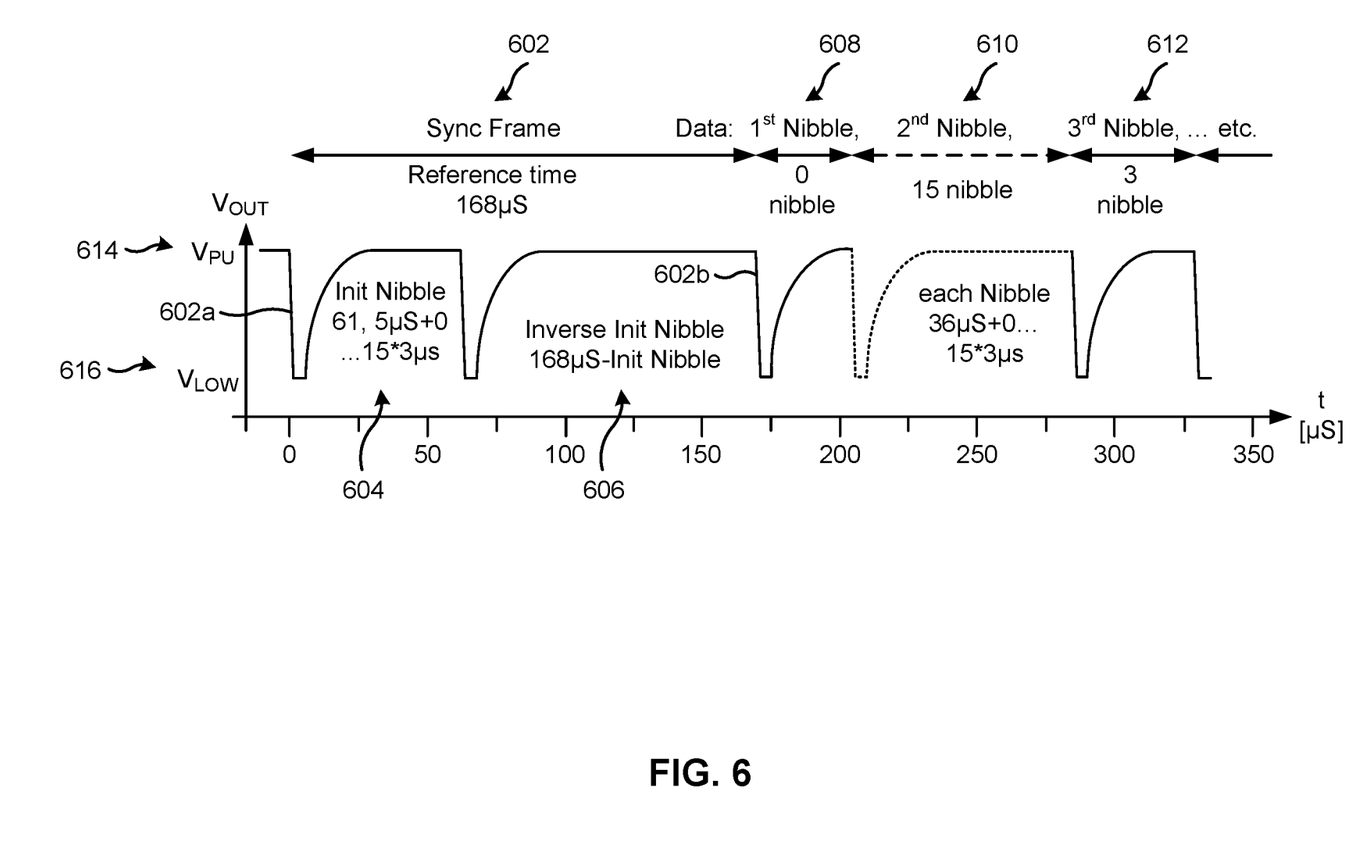
FIGS. 6-8 shows schematic signal diagrams of a sensor signal according to various embodiments.

FIG. 6 shows a schematic signal diagram of an embodiment of a sensor signal comprising a sync (synchronization) frame 602 with two signal edges 602a; 602b indicating the pre-determined synchronization time interval (having a length/duration of 168 μs). The sync frame comprises an initialization nibble 604 of length (duration) 61.5 μs+0 . . . 15*3 μs and an inverse initialization nibble 606 of length 168 μs—the length of the initialization nibble 604. FIG. 6 further shows a first nibble 608 (a 0 nibble), a second nibble 610 (a 15 nibble) and a third nibble 612 (a 3 nibble) (e.g., of the at least one data signal portion) after the sync frame 602. Each nibble comprises a duration of 36 μs (e.g., for the rising edge)+0 . . . 15*3 μs, depending on the value represented. The reference time interval and the nibbles are denoted by a falling signal edge/edge falling from $V_{PU}$ 614 to $V_{LOW}$ 616.

Some embodiments may use two initialization frames (e.g., I1 704 and I2 706 of FIG. 7) and adjust the sum of both to be constant. The constant length may be 168 us, but may be longer, since the shortest complement would only be Bus in this case.

Figure 7:
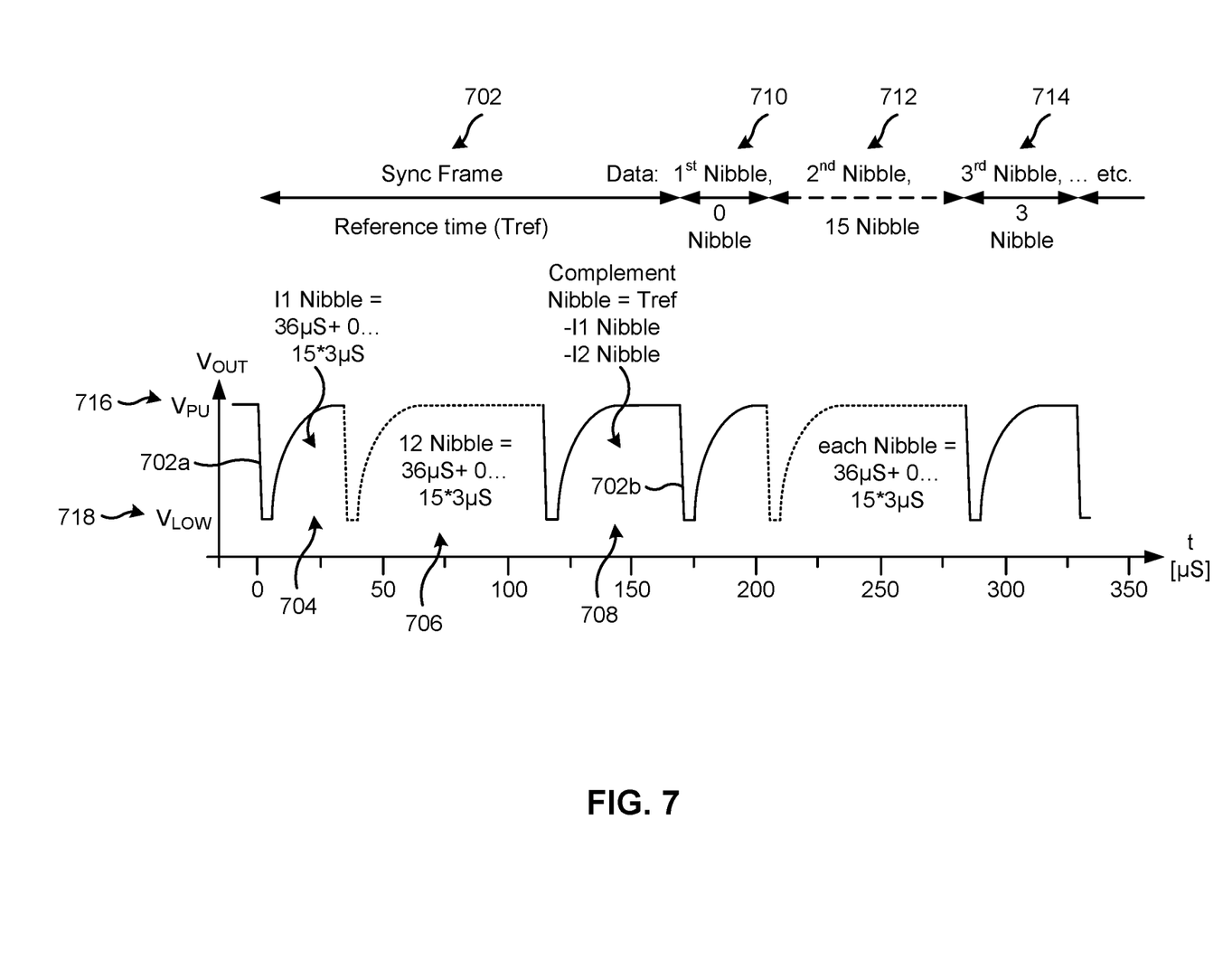

FIG. 7 shows a schematic signal diagram of an embodiment of a sensor signal comprising a sync frame 702 with two signal edges 702a; 702b indicating the pre-determined synchronization time interval. The sync frame comprises a first initialization nibble I1 704 of length (duration) 36 µs+0 . . . 15*3 µs, a second initialization nibble I2 706 of length (duration) 36 µs+0 . . . 15*3 µs and a complement nibble 708 having a length of the pre-determined synchronization time interval minus the lengths of the first and second initialization nibbles. FIG. 7 further shows a first nibble 710 (a 0 nibble), a second nibble 712 (a 15 nibble) and a third nibble 714 (a 3 nibble) (e.g., of the at least one data signal portion). Each (non-complement) nibble comprises a duration of 36 µs+0 . . . 15*3 µs, depending on the value represented. The reference time interval and the nibbles are denoted by a falling signal edge/edge falling from $V_{PU}$ 716 to $V_{LOW}$ 718.

The length of a sequence of N nibbles may be completed to a defined length by a complement nibble. The overall length of the N Nibbles and the complement (within the sync frame/located between the two signal edges indicating the pre-determined synchronization time interval) may be taken as reference time (pre-determined synchronization time interval).

The reference time may be used to decode the sync frame data content (I1 . . . IN) using the reference time of the frame, which may enable a reduced sensitivity for clock deviation, but may in some cases require storing of the nibble times until the complement is finished. Alternatively, the reference time may be taken from the sync frame of the previous message, which may allow for an immediate evaluation of the data content of each message, and may introduce an increased sensitivity for timing deviations between two (transmission) messages.

In some embodiments, the protocol may be assembled from blocks that comprise (or consist of) N nibbles (data signal portions) and a complement that completes the block to have a defined reference length (pre-determined synchronization time interval). This may additionally provide a checksum for each group of nibbles by the complement compared to the two existing protocols (SENT & SPC). This type of mechanism may be supportive to keep error detection on a high level for the case of an increased data rate.

FIG. 8 shows a schematic signal diagram according to an embodiment. The signal of FIG. 8 comprises a first and a second transmission message 810; 820. The first transmission message 810 (having a length of the reference time (pre-determined synchronization time interval)) comprises a first nibble I11 812, a second nibble I12 814 and complement nibble C1 816. The second transmission message 820 (also having a length of the reference time) comprises a first nibble I21 822, a second nibble I22 824 and a complement nibble C2 826. Each (non-complement) nibble comprises a duration of 36 µs+0 . . . 15*3 µs, depending on the value represented. The complement nibbles C1; C2 comprise a length of the pre-determined synchronization time interval minus the lengths of the respective first and second initialization nibbles.

At least some embodiments may be based on a system that is distributed over the sensor and the customers (sensor signal) receiver. Various embodiments may complement the length of a subframe to fit a constant reference length that is used as a timebase for the message decoding and avoid an empty long sync frame that brings the data rate down. Additionally, to further increase a throughput of the protocol, shorter bit times may be used to increase the data rate More details and aspects of embodiments (e.g., as introduced in connection with FIGS. 6-8) are mentioned in connection with the proposed concept or one or more examples described above (e.g., FIGS. 1 to 3). Embodiments may comprise one or more additional optional features corresponding to one or more aspects of the proposed concept or one or more examples described above or below.

Figure 9:
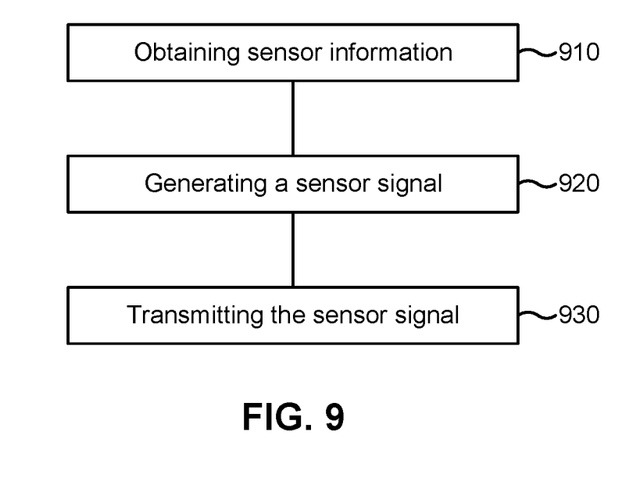
FIG. 9 illustrates a flow diagram of a method performed by a sensor controller for a sensor module.

Embodiments further provide a method for a sensor controller 10 for a sensor module 100 (as shown in FIG. 9. The method comprises obtaining 910 sensor information from the sensor module 100. The method further comprises generating 920 a sensor signal based on the sensor information. The sensor signal comprises two signal edges indicating a pre-determined synchronization time interval. The sensor signal further comprises at least one data signal portion located between the two signal edges. The method further comprises transmitting 930 the sensor signal to the sensor signal receiver.

More details and aspects of the method are mentioned in connection with the proposed concept or one or more examples described above (e.g., FIGS. 1 to 8). Embodiments may comprise one or more additional optional features corresponding to one or more aspects of the proposed concept or one or more examples described above or below.

Figure 10:
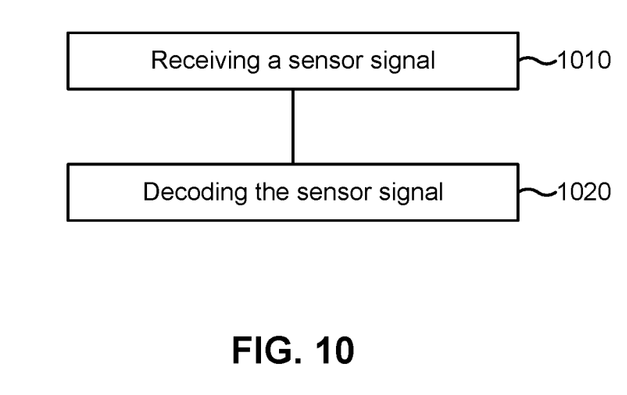
FIG. 10. illustrates a flow diagram of a method performed by a sensor signal receiver.

Embodiments further provide a method for a sensor signal receiver 200 (as shown in FIG. 10). The method comprises receiving 1010 a sensor signal from a sensor controller 10. The sensor signal comprises two signal edges indicating a pre-determined synchronization time interval. The sensor signal further comprises at least one data signal portion located between the two signal edges. The method further comprises decoding 1020 the sensor signal based on a pre-determined synchronization time interval.

More details and aspects of the method are mentioned in connection with the proposed concept or one or more examples described above (e.g., FIGS. 1 to 9). Embodiments may comprise one or more additional optional features corresponding to one or more aspects of the proposed concept or one or more examples described above or below.

The aspects and features mentioned and described together with one or more of the previously detailed examples and figures, may as well be combined with one or more of the other examples in order to replace a like feature of the other example or in order to additionally introduce the feature to the other example.

Examples may further be or relate to a computer program having a program code for performing one or more of the above methods, when the computer program is executed on a computer or processor. Steps, operations or processes of various above-described methods may be performed by programmed computers or processors. Examples may also cover program storage devices such as digital data storage media, which are machine, processor or computer readable and encode machine-executable, processor-executable or computer-executable programs of instructions. The instructions perform or cause performing some or all of the acts of the above-described methods. The program storage devices may comprise or be, for instance, digital memories, magnetic storage media such as magnetic disks and magnetic tapes, hard drives, or optically readable digital data storage media. Further examples may also cover computers, processors or control units programmed to perform the acts of the above-described methods or (field) programmable logic arrays ((F)PLAs) or (field) programmable gate arrays ((F)PGAs), programmed to perform the acts of the above-described methods.

The description and drawings merely illustrate the principles of the disclosure. Furthermore, all examples recited herein are principally intended expressly to be only for pedagogical purposes to aid the reader in understanding the principles of the disclosure and the concepts contributed by the inventor(s) to furthering the art. All statements herein reciting principles, aspects, and examples of the disclosure, as well as specific examples thereof, are intended to encompass equivalents thereof.

A functional block denoted as "means for . . ." performing a certain function may refer to a circuit that is configured to perform a certain function. Hence, a "means for s.th." may be implemented as a "means configured to or suited for s.th.", such as a device or a circuit configured to or suited for the respective task.

Functions of various elements shown in the figures, including any functional blocks labeled as "means", "means for providing a sensor signal", "means for generating a transmit signal.", etc., may be implemented in the form of dedicated hardware, such as "a signal provider", "a signal processing unit", "a processor", "a controller", etc. as well as hardware capable of executing software in association with appropriate software. When provided by a processor, the functions may be provided by a single dedicated processor, by a single shared processor, or by a plurality of individual processors, some of which or all of which may be shared. However, the term "processor" or "controller" is by far not limited to hardware exclusively capable of executing software, but may include digital signal processor (DSP) hardware, network processor, application specific integrated circuit (ASIC), field programmable gate array (FPGA), read only memory (ROM) for storing software, random access memory (RAM), and non-volatile storage. Other hardware, conventional and/or custom, may also be included.

A block diagram may, for instance, illustrate a high-level circuit diagram implementing the principles of the disclosure. Similarly, a flow chart, a flow diagram, a state transition diagram, a pseudo code, and the like may represent various processes, operations or steps, which may, for instance, be substantially represented in computer readable medium and so executed by a computer or processor, whether or not such computer or processor is explicitly shown. Methods disclosed in the specification or in the claims may be implemented by a device having means for performing each of the respective acts of these methods.

It is to be understood that the disclosure of multiple acts, processes, operations, steps or functions disclosed in the specification or claims may not be construed as to be within the specific order, unless explicitly or implicitly stated otherwise, for instance for technical reasons. Therefore, the disclosure of multiple acts or functions will not limit these to a particular order unless such acts or functions are not interchangeable for technical reasons. Furthermore, in some examples a single act, function, process, operation or step may include or may be broken into multiple sub-acts, -functions, -processes, -operations or -steps, respectively. Such sub acts may be included and part of the disclosure of this single act unless explicitly excluded.

Furthermore, the following claims are hereby incorporated into the detailed description, where each claim may stand on its own as a separate example. While each claim may stand on its own as a separate example, it is to be noted that—although a dependent claim may refer in the claims to a specific combination with one or more other claims—other examples may also include a combination of the dependent claim with the subject matter of each other dependent or independent claim. Such combinations are explicitly proposed herein unless it is stated that a specific combination is not intended. Furthermore, it is intended to include also features of a claim to any other independent claim even if this claim is not directly made dependent to the independent claim.

What is claimed is:

1. A sensor module, comprising:
   at least one sensor configured to generate sensor information; and
   processing circuitry configured to generate a sensor signal based on the sensor information,
   wherein the sensor signal comprises a sync frame, including two sync signal edges defining the sync frame and indicating a pre-determined synchronization time interval, and the sensor signal further comprises a plurality of data signal portions, including at least one data signal portion transmitted within the sync frame, and
   wherein the at least one data signal portion is provided within the sync frame located between the two sync signal edges, wherein each of the at least one data signal portion is defined by at least one data signal edge interposed in the sensor signal between the two sync signal edges.

2. The sensor module according to claim 1, wherein the sensor signal further comprises a complement portion within the sync frame, wherein the complement portion is located between the at least one data signal portion and one sync signal edge of the two sync signal edges.

3. The sensor module according to claim 2, wherein the complement portion extends from the at least one data signal portion to the one sync signal edge of the two sync signal edges.

4. The sensor module according to claim 2, wherein a combined length of the at least one data signal portion and the complement portion equals an interval between the two sync signal edges.

5. The sensor module according to claim 2, wherein the complement portion comprises checksum information related to the at least one data signal portion.

6. The sensor module according to claim 5, wherein a length of the pre-determined synchronization time interval is indicated by the checksum information.

7. The sensor module according to claim 1, wherein the sensor signal comprises two data signal portions within the sync frame located between the two sync signal edges.

8. The sensor module according to claim 1, wherein the sensor signal comprises one or more transmission messages, wherein each transmission message of the one or more transmission messages comprises two corresponding sync signal edges indicating the pre-determined synchronization time interval and at least one data signal portion located between the two corresponding sync signal edges.

9. The sensor module according to claim 8, wherein the two corresponding sync signal edges comprise a first earlier corresponding sync signal edge and a second later corresponding sync signal edge, wherein each transmission message of the one or more transmission messages comprises at least one data signal portion located after the second later corresponding sync signal edge.

10. The sensor module according to claim 1, wherein:
    the at least one data signal portion is based on a pulse width modulation encoding, and
    information comprised in the sensor signal is indicated by falling signal edges.

11. The sensor module according to claim 1, wherein the at least one data signal portion comprises information related to the sensor information or to control information, wherein each data signal portion of the at least one data signal portion corresponds to a nibble, and wherein the processing circuitry is configured to transmit the sensor signal in response to at least one of a trigger edge, a trigger pulse, or a request message.

12. A sensor signal receiver, comprising:
an interface configured to receive a sensor signal from a transmitter; and
a processing circuit configured to decode the sensor signal based on a pre-determined synchronization time interval,
wherein the sensor signal comprises a sync frame, including two sync signal edges defining the sync frame and indicating the pre-determined synchronization time interval, and the sensor signal further comprises a plurality of data signal portions, including at least one data signal portion transmitted within the sync frame, and
wherein the at least one data signal portion is provided within the sync frame between the two sync signal edges, wherein each of the at least one data signal portion is defined by at least one data signal edge in the sensor signal interposed between the two sync signal edges.

13. A method of transmitting a sensor signal, the method comprising:
generating, by at least one sensor, sensor information; and
generating, by processing circuitry, the sensor signal based on the sensor information,
wherein the sensor signal comprises a sync frame, including two sync signal edges defining the sync frame and indicating a pre-determined synchronization time interval, and the sensor signal further comprises a plurality of data signal portions, including at least one data signal portion transmitted within the sync frame, and
wherein the at least one data signal portion is provided within the sync frame located between the two sync signal edges, wherein each of the at least one data signal portion is defined by at least one data signal edge interposed in the sensor signal between the two sync signal edges.

14. The method according to claim 13, wherein the sensor signal further comprises a complement portion within the sync frame, wherein the complement portion is located between the at least one data signal portion and one sync signal edge of the two sync signal edges.

15. The method according to claim 14, wherein the complement portion extends from the at least one data signal portion to the one sync signal edge of the two sync signal edges, and a combined length of the at least one data signal portion and the complement portion equals an interval between the two sync signal edges.

16. The method according to claim 14, wherein the complement portion comprises checksum information related to the at least one data signal portion, and a length of the pre-determined synchronization time interval is indicated by the checksum information.

17. The method according to claim 13, wherein the sensor signal comprises two data signal portions within the sync frame located between the two sync signal edges.

18. The method according to claim 13, wherein:
the sensor signal comprises one or more transmission messages, wherein each transmission message of the one or more transmission messages comprises two corresponding sync signal edges indicating the pre-determined synchronization time interval and at least one data signal portion located between the two corresponding sync signal edges, and
the two corresponding sync signal edges comprise a first earlier corresponding sync signal edge and a second later corresponding sync signal edge, wherein each transmission message of the one or more transmission messages comprises at least one data signal portion located after the second later corresponding sync signal edge.

19. The method according to claim 13, wherein:
the at least one data signal portion is based on a pulse width modulation encoding, and
information comprised in the sensor signal is indicated by falling signal edges.

20. The method according to claim 13, wherein:
the at least one data signal portion comprises information related to the sensor information or to control information,
each data signal portion of the at least one data signal portion corresponds to a nibble, and
the sensor signal is transmitted in response to at least one of a trigger edge, a trigger pulse, or a request message initiated by a sensor receiver.

* * * * *